United States Patent [19]

Toibana et al.

[11] Patent Number: 4,960,627
[45] Date of Patent: Oct. 2, 1990

[54] OPTICAL RECORDING MEDIA AND PROCESS FOR PREPARING SAME

[75] Inventors: Hisaharu Toibana; Mitsuyuki Kuroiwa; Akira Todo, all of Ichihara, Japan

[73] Assignee: Mitsui Petrochemical Industries, Ltd., Tokyo, Japan

[21] Appl. No.: 340,692

[22] Filed: Apr. 20, 1989

[30] Foreign Application Priority Data

Apr. 22, 1988 [JP] Japan .................................. 63-99383
Apr. 22, 1988 [JP] Japan .................................. 63-99386

[51] Int. Cl.$^5$ ............................................. B32B 3/02
[52] U.S. Cl. ........................................ 428/64; 428/65; 428/209; 428/457; 428/913; 346/766; 346/135.1; 430/945; 369/288; 427/162; 427/166; 427/331; 427/372.2
[58] Field of Search ............... 428/64, 65, 457, 209, 428/913; 346/76 L, 135.1; 430/945; 369/288; 427/35, 50, 78, 162, 166, 331, 372.2

[56] References Cited

U.S. PATENT DOCUMENTS 4,775,568 10/1988 Itoh et al. ........................... 428/64

*Primary Examiner*—Patrick Ryan
*Attorney, Agent, or Firm*—Nixon & Vanderhye

[57] ABSTRACT

Optical recording media disclosed herein comprise a substrate and a recording layer formed thereon, wherein the recording layer is irradiated with beam of energy to form thereon bits corresponding to given pieces of information and thereby record the pieces of information. The recording layer comprises Te and Cr, the proportion of Cr contained in said recording layer being 0.1-10 atom % based on the total atoms constituting the recording layer. Processes for preparing the optical recording media disclosed above comprise forming the recording layer comprising Te and Cr on the substrate and then subjecting the thus formed recording layer to heat treatment. Oxidation resistance of said recording layer is improved and accordingly the optical recording medium comprising this recording layer can be expected to prolong its duration of life. This recording layer has excellent recording sensitivity, because the content of Cr in said recording layer is present to 0.1-10 atom %, which is lower than the Cr content in conventional recording layers. According to the process for preparing the optical recording media disclosed above, the resulting optical recording medium further improves in recording sensitivity, notwithstanding that the optical recording medium obtained is improved in durability. Moreover, it becomes possible to enlarge the recording margin.

8 Claims, 2 Drawing Sheets

OPTICAL RECORDING MEDIA AND PROCESS FOR PREPARING SAME

FIELD OF THE INVENTION

This invention relates to optical recording media of the type wherein bits corresponding to given pieces of information are formed on a recording layer provided on a substrate by irradiation with beam of energy such as light or heat, and to processes for preparing said optical recording media.

BACKGROUND OF THE INVENTION

There are two types of optical recording media, one of which is to form physically deformed portions such as holes or concavities at a certain place of a recording layer by irradiation with beam of energy, and the other of which is to form portions having been changed in optical properties such as refractive index and reflectance at a certain place of a recording layer by irradiation with beam of energy.

Recording layers consisting essentially of low melting metal such as tellurium (Te) have heretofore been known as those used in either of the two types of the optical recording media (Japanese Patent L-O-P Publns. Nos. 71195/1983 and 9234/1983). Te coating, typical of low melting metallic coatings, is capable of forming thereon desired physically deformed portions or portions having been changed in optical properties (hereinafter generically called "bits") by using a very low energy, and thus is very useful as a high sensitivity material. By sensitivity as used herein is meant that which is defined by energy ($mw/cm^2$) required for forming bits per unit surface area.

However, Te is oxidized with oxygen or moisture when allowed to stand in contact with the atmosphere, whereby it increases in transmittance and becomes transparent. Because of its thin coating as thin as about several hundreds Å, the recording layer formed by using Te alone markedly decreases in sensitivity when it increases in transmittance by oxidation of Te contained in such a thin recording layer. That is, when the recording layer composed of Te alone is oxidized, it increases in melt temperature and evaporation temperature and, at the same time, it becomes small in absorption of energy such as light as it becomes transparent, with the result that a large energy is required for forming bits and thus the recording layer markedly decreases in sensitivity. For instance, when Te coating formed on a substrate is allowed to stand in the circumstances of 70° C. and 85% RH, its sensitivity decreases by about 20% in about 5 hours, and by about 50% in about 15 hours.

With the view of solving such problems as mentioned above, there are taken various measures to prevent oxidation of Te coating. It is known as one of these measures that Te coating is coated on the surface with a stable inorganic substance. Though this measure is effective in preventing Te coating from its being oxidized, it has not been put in practical use, because the use of the stable inorganic substance results in decrease of sensitivity of the Te coating and is also expensive. On one hand, it is also known to coat Te coating on the surface with plastics, but this measure is of little real use in preventing the Te coating from its being oxidized, because the plastics permit oxygen or moisture to permeate there through with relative ease, though the plastics are advantageous in that because of their low thermal conductivity, they are low in degree of marring the sensitivity of the Te coating.

With the view of solving such problems as referred to above, Japanese Patent L-O-P Publn. No. 63038/1984 discloses optical recording media having recording layers consisting essentially of Te and additionally containing Cr. As stated in this publication, it has been known that when Cr is contained in a recording layer consisting essentially of Te, oxidation resistance of the resulting recording layer is improved in proportion to the content of Cr in said recording layer, and thus duration of life of the optical recording medium having such recording layer as mentioned above may be prolonged.

Optical recording media having recording layers consisting essentially of Te and additionally containing Cr as disclosed in the above-cited publication, however, possess such a drawback that the recording sensitivity decreases when large amounts of Cr are contained in the recording layers. On that account, it has been a common practice from the standpoint of improvement in oxidation resistance and in recording sensitivity that the content of Cr to be contained in a recording layer consisting essentially of Te is decided so as to amount of 5-15% by weight (11-27 atom% based on the total atoms present in the recording layer) based on the Te present in the recording layer, as indicated in the above-cited Japanese Patent L-O-P Publn. No. 63038/1984.

However, the present inventors have found the fact that optical recording media having Te recording layers containing 5-15% by weight, based on the Te, of Cr are still low in recording sensitivity in comparison with an optical recording medium having a recording layer consisting only of Te. As a result of extensive researches conducted by the present inventors on such optical recording media as having recording layers consisting essentially of Te and additionally containing Cr, it has been found that optical recording media having recording layers consisting essentially of Te and additionally containing a specific amount of Cr have excellent recording sensitivity in comparison with those having Te recording layers containing large amounts of Cr and, at the same time, their recording margin sometimes enlarged.

Furthermore, the present inventors prosecuted extensive researches on optical recording media having recording layers containing Te and Cr (the content of Cr is not particularly limited), and eventually have found that a recording layer containing Te and Cr is formed on a substrate and then subjected to heat treatment, whereupon the recording margin is enlarged and the recording sensitivity is further improved. By "recording margin" as used herein is meant a breadth of the range of laser output used for forming bits of a predetermined shape. When this recording margin is broader, it becomes possible to form bits uniform in shape even when a laser output is varied, with the result that the range of the laser output usable at the time of information recording and consequently the resulting optical recording layer will exclude influences of irregularities of the laser output used and the like.

OBJECT OF THE INVENTION

The present invention has been accomplished on the basis of such a new technical information as gained above, and an object of the invention is to provide optical recording media in which oxidation resistance of their recording layers is improved, in particular, under the circumstances of high temperature and humidity, duration of life of said optical recording media is prolonged and, at the same time, information can be recorded by using a small energy and, moreover, recording sensitivity is high and recording margin is broad, and to provide processes for preparing the above-mentioned optical recording media.

SUMMARY OF THE INVENTION

In order to accomplish the above-mentioned object, the optical recording media of the present invention comprise a substrate and a recording layer formed thereon, wherein information is recorded by forming bits corresponding to the information by irradiation with beam of energy.

The recording layer mentioned above comprises Te, Cr, wherein the proportion, based on the total atoms constituting the recording layer, of Cr is 0.1-10 atom%.

According to the optical recording media as mentioned above, because their recording layer consisting essentially of Te is so designed that it comprises Cr, the recording layer improves in oxidation resistance and the optical recording media can be expected to prolong their duration of life. In the present invention, moreover, the recording layer has excellent recording sensitivity, because the content of Cr in the recording layer is present to such a low value as 0.1-10 atom% in comparison with that of Cr in the conventional Te recording layer.

The processes for preparing the optical recording media of the present invention, said optical recording media comprising a substrate and a recording layer formed thereon, wherein information is recorded by forming bits corresponding to the information by irradiation with beam of energy, comprise forming said recording layer containing Te and Cr on said substrate and then subjecting the thus formed recording layer to heat treatment.

The heat treatment referred to above is preferably carried out at a temperature of 70-300° C. for at least 5 seconds, preferably 5 seconds 10 hours, more preferably 5 minutes-2 hours. In the recording layers formed by the processes for preparing the optical recording media of the present invention, the proportion of Cr contained in said recording layers is 0.1-40 atom%, preferably 0.1-10 atom % and more preferably 1-4 atom % based on the total atoms constituting the recording layer.

According to the processes for preparing the optical recording media of the present invention as illustrated above, the recording layers as formed are subjected to heat treatment, the resulting optical recording media improve further in recording sensitivity, notwithstanding the improved durability thereof. Moreover, it becomes possible to enlarge the recording margin and increase C/N at the time of reading the recording information.

Further, "recording margin is narrow" means that the range of recording energy output is narrow in order to obtain C/N more than predetermined value at the time of reading (the meaning shall apply hereinafter). In another words, it means that C/N changes according to variation of the recording energy output. Furthermore, C/N is used as an index to the extent of harsh noises produced at the time of reading the recorded information, and the higher is a value of C/N, the lesser is the noise.

DETAILED DESCRIPTION OF THE INVENTION

The present invention is illustrated below in detail with reference to embodiments thereof as shown in the accompanying drawings.

BRIEF DESCRIPTION OF THE DRAWING

As shown in FIG. 1, an optical recording medium 10 comprises of a substrate 11 and a recording layer 12 formed thereon.

Figure 1:
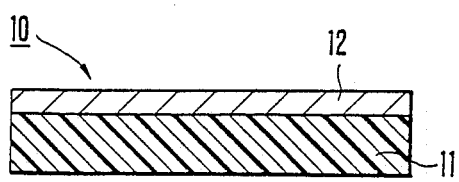
FIG. 1 is a rough sectional view of one embodiment of the optical recording media of the present invention.

Materials used for preparing the substrate 11 may be inorganic materials such as glass or aluminum and may be organic materials such as polymethyl methacrylate, polycarbonate, polymer alloy of polycarbonate with polystyrene, amorphous polyolefin as disclosed in U.S. Patent Specification No. 4,614,778, poly-4-methyl-1-pentene, epoxy resins, polyether sulfone, polysulfone, polyether imide, ethylene/tetracyclododecene copolymers and the like. A thickness of the substrate 11 may be such as sufficient to impart an appropriate rigidity to the substrate, for example, preferably 0.5-2.5 mm, more preferably about 1-1.5 mm.

The recording layer 12 of the present invention consists essentially of Te and containing Cr, and this recording layer may contain low melting elements other than Te or other components. Elements other than Te which can be incorporated into the recording layer 12 may include, for example Ti, Mn, Ni, Zr, Nb, Ta, Al, Pt, Sm, Bi, In, Se, Ph, Co, Si, Pd, Sn, Zn and the like.

The proportion of Cr contained in the recording layer 12 is preferably 0.1-10 atom%, more preferably 1-4 atom% based on the total atoms contained in the recording layer. This is because, the recording layer 12 can be improved, in particular, in recording sensitivity by virtue of the incorporation of Cr in the above-mentioned ranges into the recording layer. In the processes for preparing the optical recording media of the present invention, the content of Cr contained in the recording layers, though it is not limited to the above-mentioned ranges, is 0.1-40 atom%, preferably 0.1-10 atom % and more preferably 1-4 atom% based on the total atoms present in the recording layer.

The amounts of elements contained in the recording layer 12, for example, metallic elements, are determined by ICP emission spectroscopic analysis.

In recording information in the recording layer 12 having such composition as mentioned above, the desired recording of given pieces of information may be accomplished by irradiating the recoring layer with beam of energy such as a laser beam modulated according to the pieces of information to be recorded and forming the corresponding bits on the irradiated portions of the recording layer. The bits may be those physically deformed such as holes or concavities, or may be such portions of the recording layer in which optical properties such as refractive index and reflectance have been changed by the irradiation with beam of energy.

The recording layer 12 as mentioned above must be large in thickness to such an extent that sufficient light reflectance is obtained thereby and, at the same time, it must be small in thickness to such an extent that no sensitivity is marred thereby. To be concrete, when physically deformed portions such as holes are formed in the recording layer 12, a film thickness of the recording layer is from about 100 Å–1μm, preferably about 100–5000 Å and more preferably about 150–500 Å. When portions in which optical properties have been changed are formed in the recording layer 12, film thickness of the recording layer is about 100 Å–1μm, preferably about 100–5000 Å and more preferably about 200–2000 Å.

The recording layer 12 as illustrated above has been markedly improved in oxidation resistance and recording sensitivity in comparison with recording layer formed by using a low melting metal alone such as Te.

Figure 2:
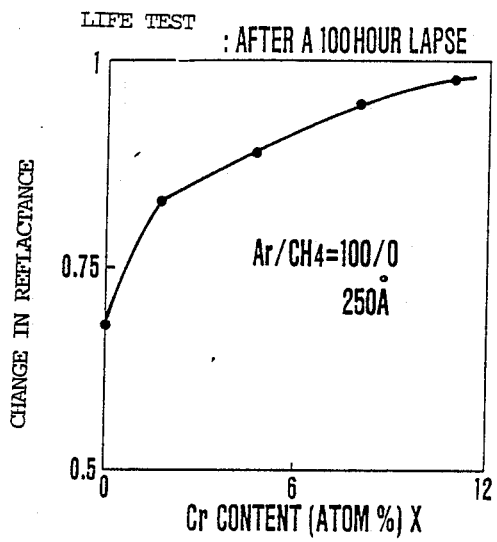
FIGS. 2-5 are graphs each showing a difference in function and effect between the optical recording media of the present invention and those of the prior art.

For instance, as shown in FIG. 2, it has been confirmed that after the lapse of 100 hours from Te preparation of a recording layer consisting essentially of Te and containing Cr, a variation in reflectance of the recording layer becomes smaller with increasing amount of Cr contained in said recording layer and thus the recording layer (Cr content X=0.1–10 atom%) of the present invention is improved in oxidation resistance in comparison with a Te recording layer (Cr content x=0), said Cr content being atom% when the content of Cr is expressed by $Te_{100-x}Cr_x$.

Figure 3:
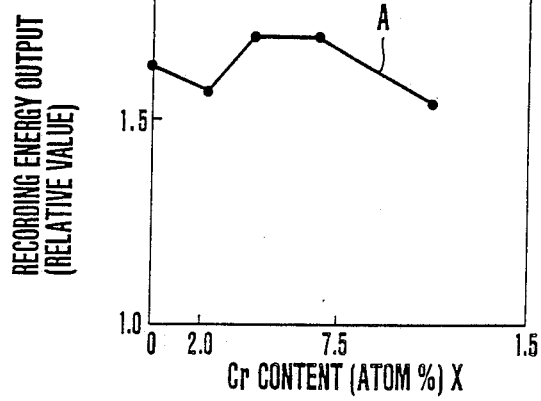

Furthermore, it has been confirmed for example, as shown in FIG. 3, that the recording layer (Cr content x=0.1–10 atom%, particularly x=1–4 atom%) of the present invention requires a relatively small recording energy output and has an improved recording sensitivity.

The processes for preparing the optical recording media of the present invention are illustrated below in detail. The recording layer 12 may be formed on the substrate 11, for example, by the following procedure. By using Te and Cr as metal sources and applying the conventionally known layer forming method, such as vacuum evaporation, sputtering or electron beam or electron beam deposition, the recording layer 12 can be formed on the substrate 11.

In forming the recording layer 12 on the substrate 11, Te and Cr may be used as separate sources, but an alloy of Te with Cr may also be used as a metal source.

In a process of the present invention, after forming the recording layer 12 on the substrate 11 in the manner as mentioned above, this recording layer 12 is subjected to heat treatment in a gas atmosphere containing an inert gas, reducing gas or oxygen. The heat treatment temperature employed in that case must be lower than the melting point of Te contained in the recording layer, and is preferably 70–300° C., especially 90–150° C. The heating time employed is preferably at least 5 seconds, preferably 5 seconds–10 hours, more preferably 5 minutes–2 hours.

By virtue of the heat treatment of the recording layer 12 after formation of said layer on the substrate 11 in the manner now described, the recording sensitivity in said recording layer sometimes improves. For instance, as shown by a curve B in FIG. 4, it has been confirmed that in comparison with a Te recording layer (shown by point A in FIG. 4) having Cr content x=0 (atom%) and being not heat treated, a recording energy output can be made very small and the recording sensitivity improves in the recording layer of the present invention having a film thickness of 250 Å which has been subjected to heat treatment at a temperature of 100° C. for 20 minutes. Furthermore, there have been confirmed such effects that by virtue of the heat treatment carried out as above, in the recording layer of the present invention which has been subjected to heat treatment, irrespective of the Cr content, the shape of bits formed at the time of information recording can be made relatively smaller than that of bits formed on a recording layer which has not been subjected to heat treatment and, at the same time, the bits which are uniform in shape can be formed on the recording layer, whereby a broad range of a recording energy output can be secured (the recording margin is broadened).

Figure 4:
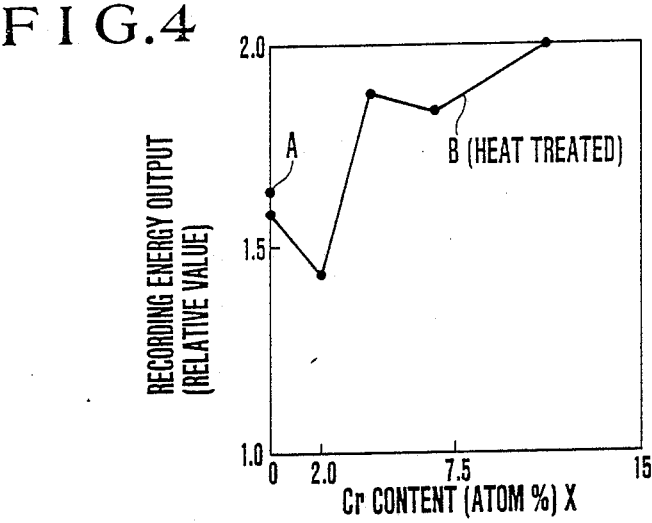

As shown by a curve B in FIG. 4, it has been confirmed that the recording layer of the present invention, in particular, when it has the Cr content of 0.1–3 atom%, requires a small recording energy output and has an improved recording sensitivity.

Figure 5:
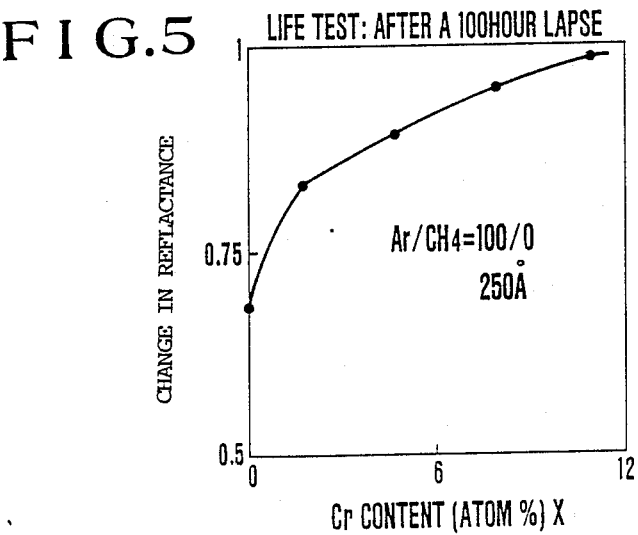

According to the present invention, as shown in FIG. 5, it has been confirmed that after the lapse of 100 hours under the circumstance of 70° C. and 85% RH from the preparation of a recording layer consisting essentially of Te and containing Cr, a change in reflactance of the recording layer becomes smaller with increasing amount of Cr contained in said recording layer and thus the recording layer of the present invention is improved in oxidation resistance in comparison with a Te recording layer (Cr content x=0), said Cr content being atom% when the content of Cr is expressed be $Te_{100-x}Cr_x$.

The present invention is not limited to the embodiment shown in FIG. 1, but it should be construed that variations and modifications can be effected within the spirit and scope of the invention.

For instance, an undercoat layer may be laminated between the substrate 11 and the recording layer 12. The undercoat layer used in that case includes, for example. films of fluorides such as magnesium fluoride ($MgF_2$), films of silicon compounds such as silicon oxide ($SiO_2$, SiO) or silicon nitrides ($Si_3N_4$), metallic films composed of Ti, Ni, Cr, Al or Ni-Cr, films of fluorine-substituted hydrocarbon compounds such as polytetrafluoroethylene (PTFE) film and/or polymer films thereof, and Cr-C-H-films films containing Cr, C and H). The undercoat layer generally has a film thickness of 10–1000 Å, preferably 50–500 Å, though the film thickness may vary according to the material used for the undercoat layer. By virtue of the film thickness as present above, these undercoat layers exemplified above can maintain their transparency and, at the same time, can exhibit various characteristics as the undercoat layer.

The undercoat layer as mentioned above may be formed on the surface of the substrate 11 in the same manner as in the case of formation of the recording layer 12 by the magnetron sputtering, vapor phase growth, plasma vapor phase growth, vacuum evaporation or spincoat process.

Provision of the above-mentioned undercoat layer between the substrate 11 and the recording layer 12 results in a further enlargement of the recording margin thereof under certain circumstances.

According to the present invention, moreover, a surface layer may be formed on the surface of the recording layer 12 of the optical recording medium 10 shown in FIGS. 1 and 4. The material used for forming the surface layer includes elements used for the recording layer, oxides of Si, Ti and the like, nitrides and metals. The surface layer has a film thickness of 5–100 Å, preferably 10–50 Å, though the film thickness may vary according to the material used for forming the surface layer.

The present invention is illustrated below in detail with reference to examples, but it should be construed that the invention is in no way limited to those examples.

EXAMPLE 1

After evacuating a vacuum receptacle, Ar gas was introduced into the receptacle, and an internal pressure in the receptacle was preset at $6\times 10^{-3}$. In the receptacle, Te and Cr individually used as targets were sputtered simultaneously, while controlling the voltage applied to each target, whereby a layer composed of $Te_{98}Cr_2$ was obtained. Simultaneously, the sputtering time was controlled to obtain a recording layer having a film thickness of 250 Å on a substrate composed of amorphous polyolefins.

EXAMPLE 2

The procedure of Example 1 was repeated to obtain a recording layer composed of $Te_{92}Cr_5$ and having a film thickness of 250 Å on the substrate.

EXAMPLE 3

The procedure of Example 1 was repeated to obtain a recording layer composed of $Te_{92}Cr_8$ and having a film thickness of 250 Å on the substrate.

EXAMPLE 4

The procedure of Example 1 was repeated with the exception of using a Te/Cr alloy as a target to obtain a recording layer composed of $Te_{91}Cr_9$ and having a film thickness of 210 Å on the substrate.

COMPARATIVE EXAMPLE 1

The procedure of Example 1 was repeated with the exception of using only Te as a target to obtain a Te recording layer having a film thickness of 250 Å on the substrate.

COMPARATIVE EXAMPLE 2

The procedure of Example 1 was repeated to obtain a recording layer composed of $Te_{77}Cr_{23}$ and having a film thickness of 250 Å on the substrate.

EXAMPLES 5

The procedure of Example 1 was repeated with the exception of using an alloy target of Te and Ni to obtain a recording layer composed of $Te_{87}Ni_7Cr_6$ and having a film thickness of 230 Å on the substrate.

EXAMPLES 6

The procedure of Example 1 was repeated with the exception of using an alloy target of Te and Cr to obtain a recording layer composed of $Te_{93}Cr_7$ and having a film thickness of 250 Å on the substrate.

EXAMPLE 7

After evacuating a vacuum receptacle, Ar gas was introduced into the receptacle, and an internal pressure was present at $6\times 10^{-3}$ Torr. In this receptacle, Te and Cr individually used as targets were sputtered simultaneously, while controlling the voltage applied to each target, to obtain a recording layer composed of $Te_{98}Cr_2$ on the substrate. Simultaneously, the sputtering time was controlled by using a shutter to obtain the recording layer having a film thickness of 250 Å on a substrate. Thereafter, the recording layer thus obtained was subjected to heat treatment at a temperature of 100° C. for 20 minutes.

EXAMPLE 8

The procedure of Example 7 was repeated to obtain a recording layer composed of $Te_{95}Cr_5$ and a film thickness of 250 Å on the substrate.

EXAMPLE 9

The procedure of Example 7 was repeated to obtain a recording layer composed of $Te_{92}Cr_8$ and having a film thickness of 250 Å on the substrate.

EXAMPLE 10

The procedure of Example 7 was repeated with the exception of using an alloy of Te and Cr as a target to obtain a recording layer composed of $Te_{94}Cr_4$ and having a film thickness of 200 Å on the substrate.

EXAMPLE 11

The procedure of Example 7 was repeated with the exception of using an alloy target of Te and Ni and a target of Cr to obtain a recording layer composed of $Te_{87}Ni_7Cr_6$ and having a film thickness of 230 Å on the substrate.

EXAMPLE 12

The procedure of Example 7 was repeated with the exception of using an alloy target of Te and In in addition to the Cr target to obtain a recording layer composed of $Te_{84}In_9Cr_7$ and having a film thickness of 250 Å on the substrate.

EXAMPLE 13

The procedure of Example 7 was repeated with the exception of using an alloy target of Te and Se and a Cr target to obtain a recording layer composed of $Te_{92}Se_5Cr_3$ and having a film thickness of 240 Å on the substrate.

[Experimental results]

(1) Information recording is effected with laser beam at a frequency of 3.7 MHz by using each of the optical recording media obtained in Examples 1-13 and Comparative Examples 1-2 to investigate a recording energy output necessary thereof. The recording energy output required for in the optical recording medium of Comparative Example 1 is taken as 1.0 for setting it up as a standard for others, showing differences by way of every 0.5 plus or minus. The results obtained are shown in Tables 1 and 2. In these tables, by margin is meant a range of laser output used for forming bits of a predetermined shape on the recording layer. When the margin becomes broader, the bits uniform in shape can be formed without being influenced by variation of the laser output.

TABLE 1

| Example | Recording output | Margin (mW) |
|---|---|---|
| 1 | 0.95 | 0.5 |
| 2 | 1.05 | 0.7 |
| 3 | 1.05 | 1.1 |
| 4 | 0.90 | 2.4 |
| 5 | 1.0 | 2.8 |
| 6 | 0.95 | 3.0 |
| Com. Ex 1 | 1.0 | 0.5 |
| 2 | 1.0 | 0.7 |

TABLE 2

| Example | Recording output | Margin (mW) |
|---|---|---|
| 7 | 0.9 | 1.6 |
| 8 | 1.15 | 1.8 |
| 9 | 1.1 | 2.0 |
| 10 | 0.9 | 2.0 |
| 11 | 1.0 | 2.7 |
| 12 | 1.1 | 1.8 |
| 13 | 1.0 | 1.6 |
| Com. Ex 1 | 1.0 | 0.5 |
| 2 | 1.0 | 0.7 |

(2) Reflectance R as measured after allowing each of the optical recording media obtained in Examples 1–6 and Comparative Examples 1–2 to stand after the lapse of 500 hours under the circumstances of 70° C. and 85% RH is compared with the original reflectance $R_o$. The results obtained are shown in Table 3.

TABLE 3

| Example | Percentage variation in reflectance $(R_0 - R) \times 100/R_0$ |
|---|---|
| 1 | 21% |
| 2 | 14% |
| 3 | 9% |
| 4 | 9% |
| 5 | 3% |
| 6 | 10% |
| Com. Ex 1 | 41% |
| 2 | 5% |

(3) Table 4 shows a value of percentage variation in reflactance $(R_0-R_{100}) \times 100/R_0$ obtained by taking reflactance as measured after allowing each of the optical recording media obtained in Examples 7–9 and Comparative Example 1 as $R_{100}$ and the original reflactance as $R_0$.

TABLE 4

| Example | Percentage variation in reflectance $(R_0 - R_{100}) \times 100/R_0$ |
|---|---|
| 7 | 17% |
| 8 | 11% |
| 9 | 5% |
| Com. Ex 1 | 32% |

What is claimed is:

1. An optical recording medium comprising a substrate and a recording layer formed thereon, in which the recording layer is irradiated with a beam of energy to form thereon bits corresponding to given pieces of information and thereby recorded the pieces of information, said recording layer having a film thickness of about 100 Å to about 1 μm and consisting essentially of Te and Cr, and the proportion of Cr contained in said recording layer is 0.1–10 atom% based on the total atoms constituting the recording layer.

2. An optical recording medium comprising a substrate and a recording layer formed thereon, in which the recording layer is irradiated with beam of energy to form thereon bits corresponding to given pieces of information and thereby record the pieces of information, said recording layer having a film thickness of about 100 Å to about 1 μm and consisting essentially of Te and Cr, and the proportion of Cr contained in said recording layer is 1–4 atom% based on the total atoms constituting the recording layer.

3. The optical recording medium as claimed in claim 1 or 2 wherein an undercoat layer is laminated between the substrate and the recording layer.

4. The optical recording medium as claimed in claim 3 wherein the undercoat layer comprises at least one film selected from among films or fluorides, films of silicon compounds, metallic films, films of fluorin-substituted hydrocarbon compounds and/or polymers thereof and films of Cr-C-H.

5. A process for preparing an optical recording medium comprising a substrate and a recording layer formed thereon, in which the recording layer is irradiated with beam of energy to form thereon bits corresponding to given pieces of information and thereby record the pieces of information, which process comprises forming the recording layer having a film thickness of about 100 Å to about 1 μm and consisting essentially of Te and Cr on the substrate and then subjecting the thus formed recording layer to heat treatment.

6. The process for preparing an optical recording medium as claimed in claim 5 wherein the proportion of Cr contained in the recording layer is 0.1–40 atom% based on the total atoms constituting the recording layer.

7. The process for preparing an optical recording medium as claimed in claim 5 wherein the proportion of Cr contained in the recording layer is 0.1–10 atom% based on the total atoms constituting the recording layer.

8. The process for preparing an optical recording medium as claimed in any of claims 5, 6 and 7 wherein the heat treatment is carried out at a temperature of 70–300° C. for at least 5 seconds.

* * * * *